Aug. 16, 1966  H. P. ANDREASEN ETAL  3,266,311

CRYOGENIC LIQUID LEVEL SENSING APPARATUS

Filed May 12, 1964  3 Sheets-Sheet 1

INVENTORS
HOWARD P. ANDREASEN
DONALD H. MUNZENMAIER

ATTORNEYS

INVENTORS
HOWARD P. ANDREASEN
DONALD H. MUNZENMAIER
BY
ATTORNEYS

United States Patent Office 3,266,311
Patented August 16, 1966

3,266,311
CRYOGENIC LIQUID LEVEL SENSING
APPARATUS
Howard P. Andreasen, West Des Moines, and Donald H. Munzenmaier, Des Moines, Iowa, assignors to Delavan Manufacturing Company, Inc., West Des Moines, Iowa, a corporation of Iowa
Filed May 12, 1964, Ser. No. 366,723
11 Claims. (Cl. 73—290)

This invention relates to liquid level sensing apparatus, and particularly to apparatus for sensing the level of cryogenic liquids.

Liquid level sensing apparatus is known employing a transducer having a mechanically oscillatory element arranged to be contacted by the liquid whose level is to be sensed. The effect of the liquid on the mechanical impedance of the oscillatory element is used to provide an indication.

One such apparatus is described in application Serial No. 113,320, filed May 29, 1961, now Patent No. 3,170,094, by Wilfred Roth for "Liquid Level Indicator." The embodiment specifically described therein employs a transducer having a diaphragm with a magnetostrictive tube attached thereto. The tube is encircled by two coils, one serving as a transmitting coil and the other as a receiving coil. The receiving coil is connected to the input of an amplifier and the transmitting coil to the output of the amplifier to form a regenerative loop including the mechanically oscillating diaphragm. With the transducer in air or other gaseous medium the diaphragm is free to oscillate, but when contacted by a liquid the diaphragm motion is strongly damped. The amplifier gain is selected to lie between the gains required to produce diaphragm oscillation when in contact and out of contact with the liquid. Means are then provided responsive to the presence or absence of oscillations in the regenerative loop for indication or control purposes.

Advantageously the operation is in the ultrasonic region and the mechanical resonance of the transducer is the principal factor determining the frequency of operation. By substantially eliminating coupling between the transmitting and receiving coils except through the mechanically oscillating diaphragm and magnetostrictive tube, there is a large difference between the amplifier gains required to produce oscillation when in and out of the liquid. This promotes satisfactory operation over a considerable range of operating conditions.

The aforesaid arrangement has been found highly satisfactory for general liquid level applications. However, when sensing cryogenic liquids certain problems arise. Cryogenic applications often call for the transducer to be located in a portion of a vessel or container where the ambient temperature, before filling, is relatively high as compared to the temperature of the liquid. For example, where sensing is used to stop filling at a desired level, or to prevent overflow, the liquid may be hundreds of degrees Fahrenheit colder than the transducer. Thus when the liquid contacts the relatively hot transducer, immediate boiling occurs thereat. The resultant layer of constantly forming gas bubbles on the diaphragm serves to effectively decouple the diaphragm from the liquid bulk. This prevents the liquid from producing sufficient mechanical impedance change until the transducer has cooled sufficiently so that boiling subsides. The time required for cooling depends on the initial temperature of the transducer, its thermal mass, etc. and may result in the liquid rising considerably above the transducer before a shut-off signal is produced, particularly when filling at a high rate. In one instance where the initial ambient temperature was 70° F. and the liquid temperature −300° F., the cool-down time for the transducer was of the order of three minutes before reliable detection occurred.

Another problem in cryogenic applications is that at very low temperatures the transducer output is markedly lower than at room temperature. The amplifier gain could be increased to compensate for the lower output. However, some applications require testing and adjusting with room temperature liquids, with assurance that the apparatus will perform satisfactorily under cryogenic conditions. Further, changes in output when the transducer is in contact with the cryogenic liquid and is cooling down undesirably affect the instrumentation.

It has been found that the boiling above described results in frequency shifts and amplitude variations in the output signal from the receiving or pickup coil of the transducer which can be used to detect the presence of the liquid during the boiling period. With the coils of the transducer regeneratively coupled through an amplifier as above described, the regenerative operating frequency varies with temperature, so that detecting the frequency shifts due to the boiling requires detection over a broad center frequency band. Detecting the amplitude variations due to boiling proved to be simpler, and highly satisfactory.

Accordingly, the present invention provides means for detecting the modulation of the output frequency of the transducer produced by the boiling of the cryogenic liquid at the transducer oscillating element, and particularly the amplitude modulation thereof. The resultant signal is then used to provide an indication of presence of liquid while the boiling continues. When boiling subsides, the liquid damps the oscillating element and the apparatus responds in normal manner. Preferably a cut-off signal is then developed to disable the boiling detector channel and prevent false actuation by extraneous signals.

Further, the invention provides means for temperature-compensating the output of the transducer so that a reasonably constant output is obtained down to cryogenic temperatures. The temperature compensation is obtained by connecting the emitter-collector circuit of a transistor across the output or pickup coil of the transducer, and varying the transistor impedance to change the loading on the pickup coil. A bias voltage is developed from a voltage divider circuit including the D.-C. resistance of the transducer output coil, and used to control the loading effect of the transistor. This temperature compensation both stabilizes the regenerative loop circuit of the transducer, and renders the output to the boiling detector circuit independent of temperature.

Although the invention will be described specifically in connection with a regenerative loop circuit, wherein it is especially advantageous, it may also be applied to non-regenerative arrangement using four-terminal transducers, wherein the transducer is driven from an independent A.-C. source. Further, although the combination of the boiling detector and temperature-compensating circuits is especially advantageous, either may be used without the other if desired for a particular application.

Other features and advantages of the invention will in part be pointed out and in part be obvious from the following description of a specific embodiment thereof.

Figure 1:
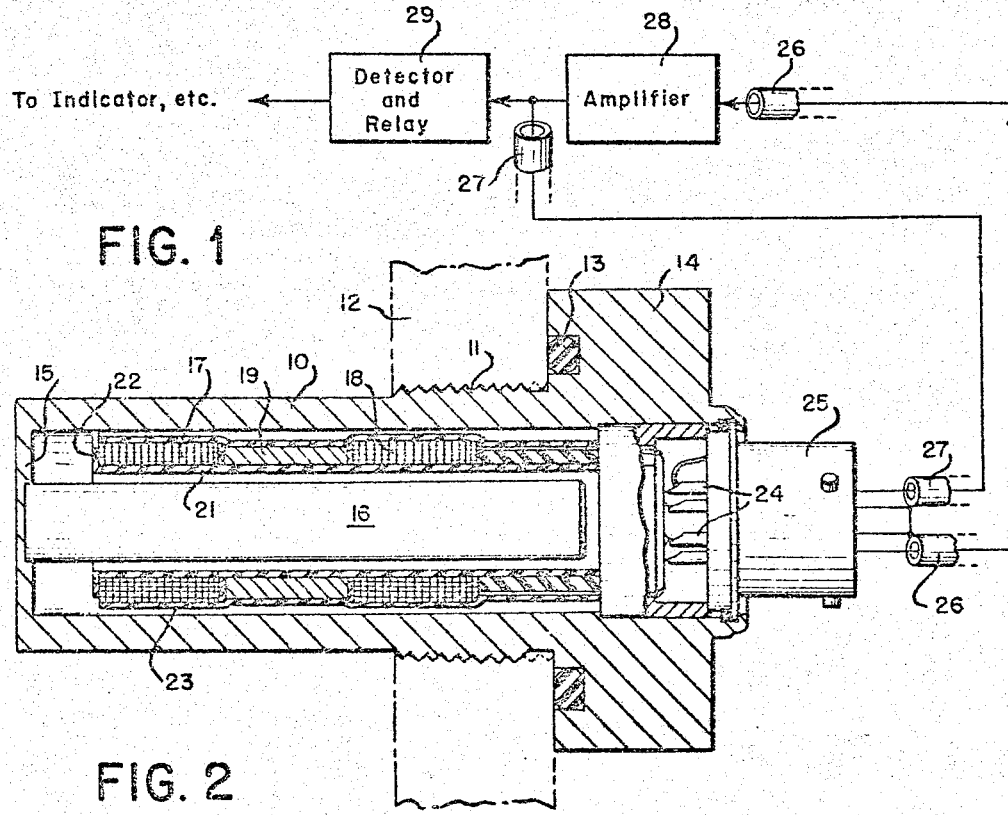
FIG. 1 shows a liquid level detector of known type, in which the invention may be employed.

Referring to FIG. 1, a liquid level sensing apparatus is shown of the type described in the aforesaid Roth application. The transducer is based on those described in copending application Serial No. 136,108 filed September 5, 1961 by Howard P. Andreasen for "Transducers."

The transducer has a casing 10 provided with a threaded portion 11 for mounting in the wall 12 of a container. A sealing ring 13 is compressed between flange 14 and wall 12. A diaphragm 15 is integrally formed at the front end of casing 10, and a tube 16 of magnetostrictive material is attached thereto. The magnetostrictive tube is encircled by two coils 17, 18 with an interposed permanent magnet 19. The coils and magnet are mounted on a cylindrical tube 21 of insulating material. At the front of tube 21 is a flange 22 having several projecting tongues which contact the inner wall of casing 10 at spaced points to hold the tube in place. The rear end of tube 21 is suitably supported by means not shown. The coils and magnet have a length of flexible tubing 23 drawn thereover to facilitate assembly and form a secure mechanical arrangement during use. The leads to the coils are brought out to four pins 24 in a connector 25. As described in the aforesaid Andreasen application, the distance from the plane of the diaphragm to the wall 12 is approximately a half-wavelength at the operating frequency so that the periphery of diaphragm 15 is dynamically clamped against axial movement.

The foregoing description suffices for present purposes, but reference may be made to the above Andreasen application for further details if desired.

The leads of each coil are connected to respective coaxial conductors 26, 27. One lead of each coil is connected to the sheath of the respective coaxial conductor and both sheaths are connected together as indicated. In practice cables 26, 27 will be part of a single cable provided with a suitable connector for engagement with 25, but this is omitted for clarity of illustration.

One coil, say 17, is connected by a cable 26 to the input of amplifier 28, and the other coil 18 is connected by cable 27 to the output of the amplifier. Thus, regenerative loop oscillations are obtained as described in the aforesaid Roth application. With the transducer in air or other gaseous medium, the diaphragm 15 is relatively free to oscillate. However, when contacted by a liquid its motion is strongly damped. The amplifier gain is selected to lie between the gains required to produce mechanical oscillation of diaphragm 15 when in contact with and out of contact with the liquid. The output of amplifier 28 is supplied to a detector and relay 29 so as to respond to the presence or absence of oscillations in the regenerative loop. The output of 29 may be supplied to a suitable indicator, used for control, etc.

Figure 2:
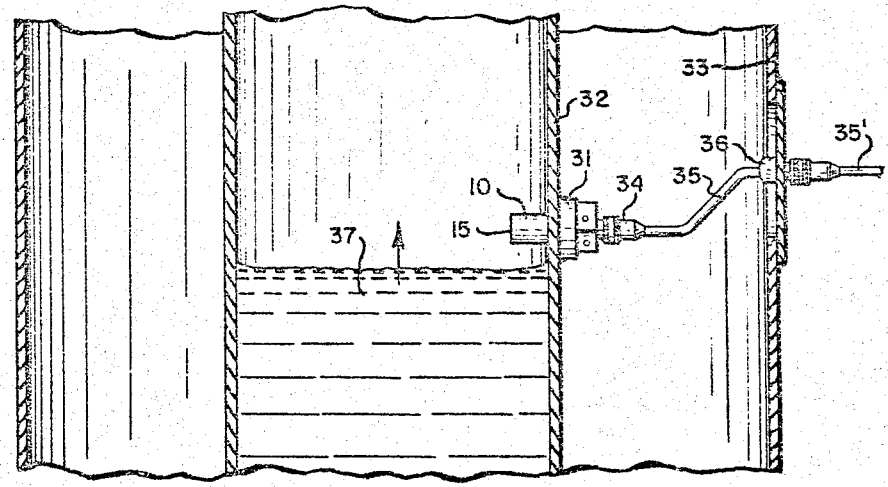
FIG. 2 shows the transducer of FIG. 1 arranged in the wall of a tank for sensing liquid level.

Referring to FIG. 2, the transducer 10 is shown mounted in a fitting 31 welded to the inner wall 32 of a double-walled tank having an outer wall 33. A fitting 34 couples cable 35 to the transducer. Cable 35 may include two independent coaxial cables such as shown at 26 and 27 in FIG. 1. The cable leads to a suitable fitting 36 mounted in the outer wall 33 and coupled by a second similar cable 35' to an amplifier and detection unit.

The arrangement so far described has been found to be very satisfactory for general liquid level detection. When the surface of the liquid 37 is below the transducer, diaphragm 15 is free to oscillate at a frequency primarily determined by the natural resonant frequency of the transducer. The frequency is advantageously in the ultrasonic region. When the level of the liquid rises and contacts diaphragm 15 the motion of the diaphragm is damped and, as the liquid rises to cover the diaphragm, the damping causes oscillation to cease. The exact liquid level at which the regenerative oscillations cease depends on the gain of amplifier 28.

In cryogenic applications, the initial temperature of the transducer may be far above that of the liquid. Thus, when the liquid contacts the transducer, boiling occurs. As described above, initially a layer of constantly forming bubbles is present on the surface of diaphragm 15 and serves to effectively decouple the diaphragm from the liquid bulk. This prevents the liquid from producing sufficient damping of the diaphragm, until the transducer has cooled and boiling subsides.

Figure 3:
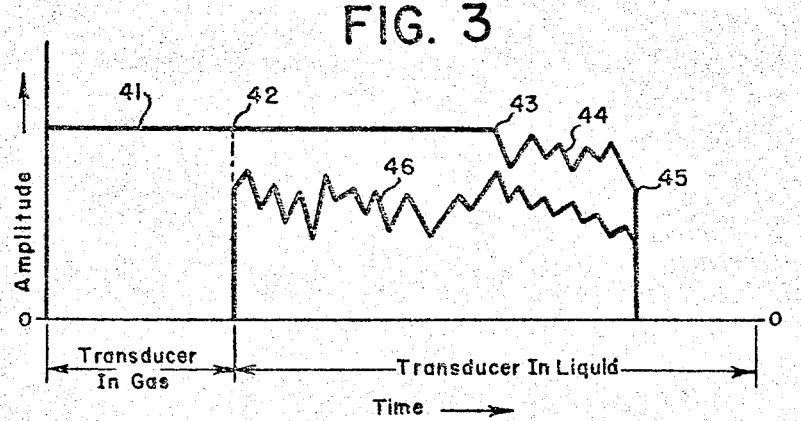
FIG. 3 shows curves illustrative of the operation of FIG. 1 with a cryogenic liquid.

Referring to FIG. 3, amplitude-time curves are shown to illustrate signal changes when the transducer at a relatively high temperature is immersed in a cryogenic liquid. Although somewhat idealized, the curves serve for purposes of illustration.

Assuming a normal operating frequency of, say, 40 kc., line 41 represents the amplitude of the 40 kc. signal from the amplifier to the drive coil of the transducer. To the left of point 42, the transducer is in air or other gaseous medium and the diaphragm is free to oscillate. Due to the regenerative feedback through amplifier 28 as described in connection with FIG. 1, the amplifier will be driven into saturation until the overall loop gain stabilizes to give an output represented by line 41. At point 42, the transducer is immersed in a cryogenic liquid and boiling occurs. Initially the resultant bubbles effectively decouple the transducer diaphragm from the liquid mass and little damping of the diaphragm oscillation occurs. As the transducer cools, the boiling becomes less violent and the diaphragm movement begins to be damped. However, due to the saturation of amplifier 28, the decrease in amplitude of diaphragm oscillation is counterbalanced by an increase in gain in the amplifier so that the output remains relatively constant until the amplifier starts to become unsaturated. This point is indicated at 43. Thereafter, the output starts to decrease. Assuming point 43 is reached before boiling has completely ceased, the variation in the relative amounts of gaseous bubbles and liquid contacting the diaphragm causes a fluctuation in the damping so that the amplifier output fluctuates as shown by the jagged line 44. Finally, the output will be reduced to the point 45 at which regenerative oscillations cease.

The lower jagged line 46 represents the amplitude of the modulation of the 40 kc. output signal from the transducer pickup coil produced by the boiling. Modulation starts at point 42 where the transducer is first immersed in the cryogenic liquid and continues to point 45 where regenerative oscillations cease and there is no longer any transducer output. With a transducer like that shown in FIG. 1, amplitude and frequency modulation of the 40 kc. transducer output of the order of 10% in the frequency range of 10–400 cycles per second has been noted. The scale for curve 46 is much enlarged compared to that for 41 to facilitate illustration. It may be mentioned that although the boiling signal occurs in the output of the transducer, it is substantially removed from the input thereto between points 42 and 43 due to the saturated condition of the amplifier.

The exact nature of the boiling signal may depend on a number of factors. Visual observation of the boiling on the diaphragm shows intense boiling over the entire surface when the transducer is first immersed in the cryogenic liquid. As the transducer cools, its outer case reaches temperature equilibrium with the liquid far more quickly than the internal parts of the transducer. The coils, magnet and internal supporting structure in the transducer (see FIG. 1) are thermally insulated from the outer case of the transducer. The magnetostrictive tube 16, say of nickel, tends to act as a thermal conductor for the internal components. The heat traveling down the tube toward the diaphragm appears at the center of the diaphragm and it has been noticed that the boiling continues in this area until all boiling ceases. The center of the diaphragm is subject to greatest excursion during oscillation, and hence is more sensitive to mechanical or acoustic effects than the outer regions of the diaphragm. Because boiling continues to occur in the transducer's most sensitive region until temperature equilibrium is reached, a continuous boiling signal is available in the pickup coil. This explains why the curve 46 does not decrease more rapidly as overall boiling decreases. While this explanation seems reasonable and to agree with the observed phenomena, it is not insisted upon. Further, with different transducers there may be changes in the detailed characteristics of the boiling signal.

Figure 4:
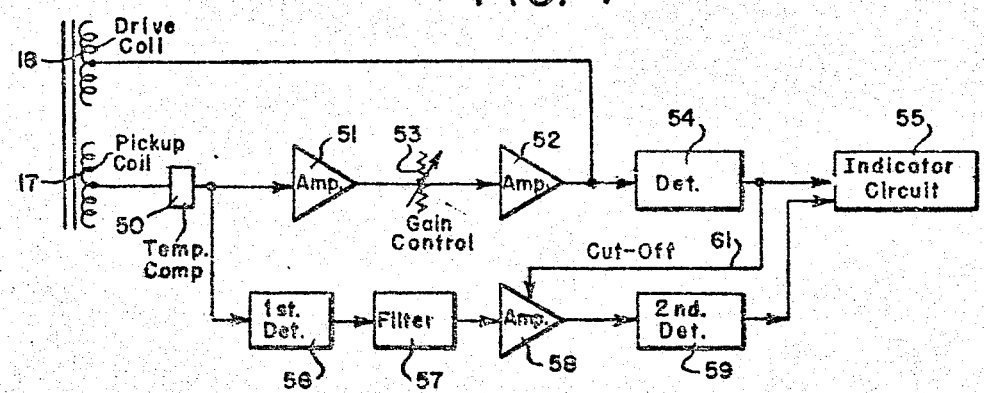
FIG. 4 is a block diagram of a circuit in accordance with the invention including a boiling detector and temperature compensation.

Referring to FIG. 4, a block diagram of the invention is shown. Here the amplifier 28 of FIG. 1 is separated into two amplifiers 51 and 52, with a gain control 53 therebetween. This enables the gain around the regenerative loop including drive and pickup coils 17, 18 to be adjusted, as above described. Detector 54 is responsive to the amplitude of the regenerative loop oscillations, and when they decrease to a predetermined point the output of the detector actuates the indicator circuit 55. A temperature-compensation circuit 50 is provided, as will be described later in connection with FIG. 6.

The boiling detector circuit includes a first detector 56 supplied with the temperature-compensated output of the pickup coil in order to obtain the modulation components thereof. The output of the first detector is supplied to a filter 57 which confines operation to the frequency region of the boiling signals, say, below 500 cycles per second. The boiling signal is then amplified in amplifier 58 and supplied to a second detector 59 which develops a D.-C. output proportional to the amplitude of the boiling signal. This output is supplied to the indicator circuit 55. When the oscillations in the regenerative loop including amplifiers 51, 52 have ceased, indicating the sensing of a true liquid level, detector 54 is arranged to supply a cutoff signal through line 61 to amplifier 58, so as to disable the boiling detector circuit.

Figure 5:
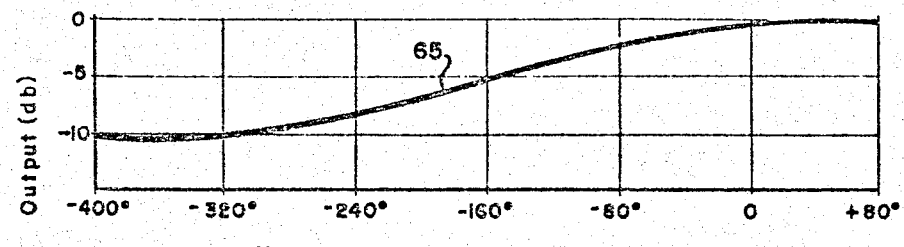
FIG. 5 is a curve illustrating the change in output of the transducer of FIG. 1 as a function of temperature.

Referring now to FIG. 5, curve 65 shows the decrease in the output of the transducer of FIG. 1 as its temperature is reduced from +80° to —400° F., with the input held constant. Over this range, the output changes by about 10 db. The reasons for this decrease in output are not fully understood. Investigation indicates that several different factors contribute to it. The most important factor appears to be the non-linear and to some degree divergent shifting of the independent resonant frequencies of each mechanical resonant mode in the transducer which enter into determining the overall resonant frequency. As developed more fully in the aforesaid Andreasen application, the transducer of FIG. 1 has a natural resonant frequency due to the magnetostrictive tube 16 per se, another resonant frequency due to the diaphragm 15 per se, a longitudinal resonant frequency in casing 10 between the diaphragm and the support 12, and a ring mode of oscillation resonant frequency determined by the diameter and thickness of the diaphragm end of casing 10. Since these elements are mechanically coupled, their independent resonant frequencies interact to determine the overall operating frequency. The dimensions of these elements will change with temperature, but to different degrees depending upon their material. The effect of the change in the dimensions of each element may be expected to be different depending upon the significance of each element in determining the overall operating frequency. Thus an optimum relationship at room temperature may become non-optimum at low temperature, causing the observed decrease in output. Other factors are believed to enter into the decrease in output at low temperatures, such as stiffening of the support 21 which contacts the casing at flange 22, etc. but to a lesser degree.

Regardless of the explanation for the decrease in output, if the amplifier gain in the feedback loop is adjusted for optimum performance with room temperature liquids, it will not in general be optimum at cryogenic levels. Further, since the modulation produced by boiling at the surface of the diaphragm may be expected to vary with the overall output level of the transducer, a considerable variation in the boiling signal may be expected which is due not to the boiling but to the change in transducer temperature. Thus, reliable operation under different service conditions might require changes in the circuit to suit each installation, which is highly undesirable.

Accordingly, the present invention provides a temperature compensating circuit which causes the output of the transducer to be relatively constant over a wide temperature range, but requires only a simple and reliable circuit. This will be explained in connection with the detailed circuit diagram of FIG. 6.

Figure 6:
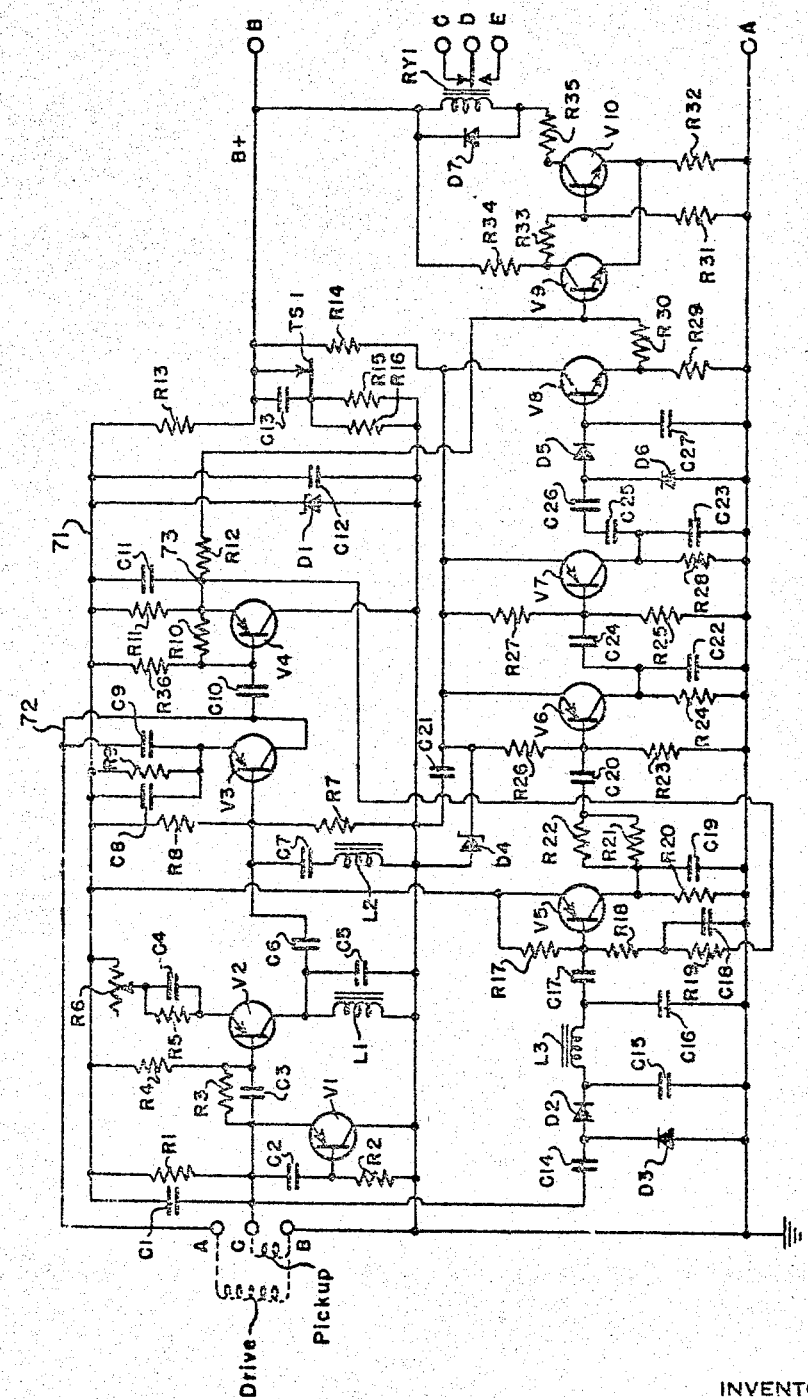
FIG. 6 is a schematic circuit diagram of a specific embodiment of the invention.

Referring to FIG. 6, terminals A and B are for connection to the drive coil, and C and B to the pickup coil. These coils are accordingly indicated in phantom. In this diagram resistors are indicated as "R," capacitors by "C," inductances by "L," transistors by "V" and diodes by "D," each followed by an appropriate numeral. In accordance with present conventions, transistors of the PNP type have the emitter arrow pointing toward the base, and those of the NPN type have the emitter arrow pointing away from the base. Interchange of transistor types with appropriate changes in their connections and/or polarity of bias supply may be made, as will be understood by those skilled in the art.

The temperature compensation circuit includes a transistor V1 having its emitter-collector circuit connected across the pickup coil. Operating voltage for the emitter-collector circuit is provided by a voltage divider from the B+ line 71, comprising R1 and the D.-C. resistance of the pickup coil. This D.-C. resistance will vary with the temperature of the transducer and hence the voltage thereacross will vary. In one particular embodiment of the D.-C. resistance at room temperature was approximately 80 ohms and dropped to slightly under 10 ohms at —325° F., and the value of R1 was selected to give a D.-C. voltage across terminals B and C which varied from +0.175 volt to 0.021 volt over this range.

The signal from the pickup coil at terminal C is applied directly to the emitter of V1, and through C2 to the base. The base is biased in the forward direction through R2. During positive swings of the pickup output both the emitter and base of V1 swing in the positive direction, the emitter by the full amount due to direct connection to terminal C and the base by a somewhat lesser amount due to voltage divider action between C2 and R2. Due to the low emitter-collector D.-C. voltage, V1 is operating in a voltage starved condition and the increased voltage due to the signal immediately results in increased conduction which lowers the load resistance across the pickup coil and decreases the signal output therefrom. Since the base follows the emitter during the positive swings it has been found that the reduction in pickup output can be obtained without clipping. The load impedance will vary inversely with the strength of the pickup signal.

During the negative swings of the pickup signal, the base-collector of V1 conducts as a diode and the resultant low impedance in shunt with R2 reduces the overall impedance from base to ground to a low value. This leaves C2 as the load across the pickup coil and the output signal is reduced substantially below its unloaded value. In practice it has been found that there is some difference in amplitude between positive and negative peaks, but this has not been found objectionable. In one instance, under room temperature conditions, the load impedance on positive peaks was around 1200 ohms and on negative peaks around 2000 ohms, with the negative peaks about 40% greater than positive peaks.

As the transducer cools down from room temperature, the resistance in the pickup coil decreases, thus decreasing the D.-C. voltage across V1. This decreases the loading effect (increases the load impedance) of V1 on the pickup coil and compensates for the decreased output thereof. In effect, transistor V1 could be thought of as a diode with negative internal resistance. The loading effect can be controlled by appropriate selection of the values of R1 and R2. Also, R3 has some effect. In one instance, inserting the temperature compensation circuit caused the pickup output to change from about 1500 millivolts to 150 millivolts R.M.S., at room temperature. The input impedance of V2 will change with the decreased signal level, so that an overall change of around 10 db resulted. The amplifier gain was increased accordingly. Thereafter the output remained relatively constant down to −325° F. As to the degree of constancy, using a number of production pickups and 20% tolerance resistors, the variation from room temperature down to −325° F. did not exceed 2 db, and this was considered satisfactory since the variation was small compared to the difference in gain of the amplifier between immersed and non-immersed conditions of the transducer.

The operation of the temperature compensation circuit is not fully understood. Thus, although the above explanation is believed correct, it is not insisted upon and is subject to further elaboration.

Describing now the remainder of the circuit of FIG. 6, many of the components associated with individual stages function in conventional manner and will not be described in detail. The temperature compensated signal at terminal C is applied through C3 to the base of transistor V2 which functions as an amplifier. The emitter of V2 is connected to the B+ supply line 71 through a biasing resistor R5 shunted by C4, and an unshunted rheostat R6. By adjusting R6 the loop gain may be changed. The collector output circuit includes L1 shunted by C5 to form a parallel resonant circuit tuned to the operating frequency of the transducer, in this case 40 kc. This tuning promotes efficiency of amplification, but the resultant amplifier bandwidth is still broad compared to the resonant bandwidth of the transducer which advantageously has a high Q mechanical resonance. Accordingly, even though the frequency of mechanical resonance of the transducer changes under operating conditions, it will still lie within the bandwidth of the amplifier.

The output of V2 is coupled through C6 to the base of V3 also functioning as an amplifier with the base biased by R7, R8. A series-resonant shunt circuit is formed by C7 and L2. The particular transducer employed had an undesirable secondary resonance at about 76 kc. and the series resonance circuit is tuned to eliminate this frequency and thereby prevent regenerative oscillations from developing thereat. R9 shunted by C8 provides emitter bias. The collector output of V3 is fed back through lead 72 to terminal A, which is connected to the drive coil. Capacitor C9 plus the inherent capacitance in the cable to the transducer serves to broadly resonate the inductance of the drive coil (about 13.5 millihenries) at the operating frequency of 40 kc. One side of the capacitor is connected directly to terminal A and the other side is effectively connected to ground at 40 kc. through C8 and C12. Similarly, C1 is selected to broadly resonate the inductance of the pickup coil (also about 13.5 millihenries) at 40 kc., being returned to ground through C12.

The collector of V3 is connected through C10 to the base of V4 which serves as a rectifier and D.-C. amplifier to determine whether the regenerative loop circuit is oscillating or not. When the loop circuit is oscillating at full amplitude, V3 will be driven far into saturation and a substantially square wave of large amplitude, say 6 or 7 volts R.M.S., will be delivered through line 72 to the transducer drive coil. Under these conditions V4 will operate non-linearly and develop a substantial D.-C. voltage across the emitter load R11 shunted by C11, thus causing the potential of point 73 to be considerably below that of line 71. On the other hand, when the loop oscillations cease, the potential of point 73 will be higher, approaching that of line 71.

The D.-C. potential at point 73 is supplied through R12 to the base of V9. Transistors V9 and V10 are connected as a Schmitt trigger circuit. The collector of V9 is connected to the base of V10 through R33, and the coil of relay RY1 is connected in the collector output circuit V10. R32 forms a common emitter load for the two transistors.

When the base potential of V9 is below the switching level, V9 is non-conducting and V10 is conducting to energize relay RY1. When the base goes above the switching level V9 conducts, hence rendering V10 non-conductive and deenergizing the relay. The circuit constants are selected so that the switching level lies between the potentials at point 73 corresponding to oscillating and non-oscillating conditions of the regenerative loop. Accordingly, when the potential of point 73 is at its lower level, corresponding to full amplitude of oscillation in the regenerative loop, RY1 is energized. As the transducer becomes damped by a liquid in contact therewith and oscillations cease, the higher potential at point 73 switches the Schmitt trigger circuit and deenergizes RY1. D7 serves to damp any transient oscillations which might occur in the coil of RY1 upon rapid cutoff, and prevents the application of an excessively high transient voltage to the collector of V10.

Considering now the boiling detector circuit, the temperature-compensated output of the pickup coil at terminal C is supplied through C14 to a voltage doubler halfwave rectifier including D2, D3 and C15. L3 and the total shunt capacitance to ground serve as a low pass filter to pass only the modulation components due to the boiling. The resulting A.-C. modulation signal is supplied through C17 to the base of transistor V5, C17 serving to eliminate the D.-C. component corresponding to the rectified 40 kc. carrier.

Forward bias for the base of V5 is obtained through R17, R18 and R19, the latter being connected to point 73 in the output of V4. When the output of V4 is at a level corresponding to strong regenerative loop oscillations, point 73 is sufficiently negative to the B+ supply in line 71 to bias V5 in the forward direction and V5 functions as an amplifier. However, when regenerative loop oscillations cease, the potential of point 73 rises toward that of line 71, thus removing the forward bias on the base of V5 and substantially cutting off emitter-collector current therein.

Assuming that V5 is amplifying, the collector output is supplied through a series attenuator including R21, R22, and through C20 to V6. Changing the values of R21 and R22 changes the gain in the boiling detector circuit. It has been found desirable to avoid excess gain in this circuit so that it will not be unduly sensitive to extraneous signals which may occur in some environments. On the other hand, sufficient gain should be provided so that the output signal is maintained at a sufficiently high level to actuate the indicator circuit throughout the boiling period, and until sufficient damping has occurred in the regenerative loop to stop oscillations therein. If desired one of the resistors R21, R22 may be made adjustable.

V6 functions as an amplifier and the collector output is supplied through C24 to the base of V7. V7 serves as a driver for the half-wave rectifier and voltage-doubling circuit including diodes D5, D6 and C27. The signal from V7 is supplied through C25 and C26 to the voltage doubler. This develops a D.-C. signal varying with the amplitude of the boiling signal. The D.-C. signal is applied to the base of V8 connected as an emitter follower, and the output is supplied through R30 to the base of V9. When the signal at the emitter of V8 goes above the switching level, V9 will conduct, hence rendering V10 non-conductive and deenergizing the relay RY1.

It will therefore be seen that V9 is rendered conductive to deenergize relay RY1 either by a detected boiling signal exceeding a given level, or by the cessation of oscillations in the loop circuit. When the loop oscillations cease, V5 is cut off as above described, so that the boiling detector circuit is disabled. It has been found that once the boiling subsides to the point where the loop circuit drops out of oscillation, it is possible for bubbles to form again and cause the loop circuit to resume oscillation. This would cause an intermittent action of the relay which is undesirable. Therefore, capacitor C18 is employed to form a time constant circuit with R19 which introduces a small delay in the removal of forward bias from the base of V5 so that the boiling detector circuit will continue to function until positive liquid damping occurs to definitely stop oscillations in the loop circuit.

The delay provided by C18 and R19 also serves to prevent the boiling detection circuit from operating on a signal produced when the liquid has been in a position covering the transducer and is suddenly withdrawn. Under such a circumstance loop oscillations will resume, and relay RY1 should be energized. Unless the forward bias applied to V5 were delayed, the beginning of oscillation in the regenerative loop circuit might produce a signal in the boiling detector circuit which would delay energization of relay RY1. Since V5 is substantially cut off under these conditions, it cannot go into conduction until C18 as charged and this time is sufficient to allow the signal in the pickup coil to reach a stable state.

C27 and the base input impedance of V8 form an RC circuit which smooths out fluctuations in the boiling detector signal which might arise during the short periods of intermittent bubble production when the transducer has nearly reached temperature equilibrium with the liquid, so that relay RY1 is held deenergized by the boiling detector signal until the loop oscillations cease.

D1 is a Zener diode which stabilizes the B+ supply at line 71. D4 is also a Zener diode which produces a stable voltage supply of proper magnitude for V6, V7 and V8.

Although the control unit containing the circuit shown in FIG. 6 may be located remote from the transducer, it may nevertheless be exposed to somewhat low environmental temperatures in some applications. Accordingly, heat resistors R15 and R16 are supplied with current through a thermostatic switch TS1 to supply heat to the control amplifier unit as required to maintain a reasonably uniform temperature.

In the circuit shown in FIG. 6, the following values of components have been used. It will be understood that these are given for illustration only, and not by way of limitation.

Resistors (ohms):
```
68    ---------------- R32
220   ---------------- R5, R9
330   ---------------- R14
470   ---------------- R13, R35
1.5K  ---------------- R11
2.2K  ---------------- R28, R29, R34
4.7K  ---------------- R1, R2, R12, R20, R24, R30
6.8K  ---------------- R4, R8
10K   ---------------- R6, R17, R26, R27, R31
22K   ---------------- R10, R33, R36
47K   ---------------- R3, R7
68K   ---------------- R21
100K  ---------------- R19, R22
220K  ---------------- R18
330K  ---------------- R25
470K  ---------------- R23
```

Capacitors (microfarads):
```
.002  ---------------- C7
.004  ---------------- C6, C15
.005  ---------------- C1, C2, C9, C10
.007  ---------------- C5
.01   ---------------- C3, C14
```

Capacitors (microfarads):—Continued
```
.02   ---------------- C13, C19, C22, C23
0.1   ---------------- C16
1.5   ---------------- C17, C20
2.2   ---------------- C4, C8, C24
10    ---------------- C11, C25, C26
20    ---------------- C27
50    ---------------- C12, C18, C21
```

Inductances (millihenries):
```
1.5   ---------------- L1, L2, L3
```

Transistors:
```
10455 ---------------- V1, V2, V3
10456 ---------------- V4
2N1305 --------------- V5, V6, V7
2N696 ---------------- V8, V9, V10
```

Diodes:
```
1N1771 --------------- D1
1N96A  --------------- D2, D3, D5, D6, D7
1N1778 --------------- D4
```

Nominal voltages were 28 volts at terminal B, 10 volts in line 71, and 18 volts in the line controlled by D4 (at collector of V8).

The invention has been described in connection with a specific embodiment thereof which has been found satisfactory in practice. However, it will be understood by those skilled in the art that many modifications are possible within the spirit and scope of the invention. Also, selected features may be employed and others omitted as meets the requirements of a given application.

We claim:
1. Cryogenic liquid level sensing apparatus which comprises
   (a) a transducer having a mechanically oscillatory element arranged for contact by a cryogenic liquid whose level is to be sensed,
   (b) driving means for producing oscillation of said element,
   (c) pickup means for producing an A.-C. output signal in response to oscillation of said element,
   (d) means responsive to changes in said output signal for indicating contact of said oscillatory element by said liquid,
   (e) and means for detecting modulation of said output signal by boiling of said cryogenic liquid at the surface of said oscillatory element.
2. Cryogenic liquid level sensing apparatus which comprises
   (a) a transducer having a mechanically oscillatory element arranged for contact by a cryogenic liquid whose level is to be sensed and be damped thereby,
   (b) drive means in the transducer for producing mechanical oscillation of said element in response to an input electric signal thereto,
   (c) pickup means in the transducer for producing an output electric signal in response to mechanical oscillation of said element,
   (d) an amplifier having an input connected to said pickup means and an output connected to said drive means in regenerative relationship to form a regenerative loop including the mechanically oscillatory element,
   (e) the gain of the amplifier being predetermined to lie between the gains required to produce oscillation of said element when in contact with and out of contact with said liquid,
   (f) detection means for detecting the presence or absence of oscillations in said regenerative loop,
   (g) and detection means for detecting modulation of said output signal of the pickup means produced by boiling of said cryogenic liquid at the surface of said oscillatory element.
3. Apparatus in accordance with claim 2 including indicating means responsive to each of said detection means, and means responsive to the cessation of oscilla- tions in said regenerative loop for cutting off response of said indicating means to the modulation detection means.

4. Cryogenic liquid level sensing apparatus which comprises
   (a) a transducer having a mechanically oscillatory element arranged for contact by a cryogenic liquid whose level is to be sensed and be damped thereby,
   (b) drive means in the transducer for producing mechanical oscillation of said element in response to an input electric signal thereto,
   (c) pickup means in the transducer for producing an output electric signal in response to mechanical oscillation of said element,
   (d) an amplifier having an input connected to said pickup means and an output connected to said drive means in regenerative relationship to form a regenerative loop including the mechanically oscillatory element,
   (e) the gain of the amplifier being predetermined to lie between the gains required to produce oscillation of said element when in contact with and out of contact with said liquid,
   (f) a detector connected to receive oscillations from said regenerative loop and produce a D.C. output signal having different levels under oscillatory and non-oscillatory conditions in the loop,
   (g) an amplitude modulation detector connected to receive the output of said pickup means and detect modulation thereof produced by boiling of said cryogenic liquid at the surface of said oscillatory element,
   (h) an amplifier and second detector connected to receive the output of said amplitude modulation detector and produce a D.-C. output signal varying with said modulation,
   (i) an indicating circuit responsive to said D.-C. output signals,
   (j) and a cut-off circuit responsive to the first-mentioned D.-C. output signal for supplying operating bias to the last-mentioned amplifier when loop oscillations are present and removing the bias to cut off the amplifier when loop oscillations are absent.

5. Apparatus in accordance with claim 4 including delay means in said cut-off circuit for introducing a time delay in the supplying and removal of said bias.

6. Cryogenic liquid level sensing apparatus which comprises
   (a) a transducer having a mechanically oscillatory element arranged for contact by a cryogenic liquid whose level is to be sensed and be damped thereby,
   (b) drive means in the transducer for producing mechanical oscillation of said element in response to an input electric signal thereto,
   (c) a pickup coil in the transducer for producing an A.-C. output signal in response to mechanical oscillation of said element,
   (d) an amplifier having an input connected to said pickup coil and an output connected to said drive means in regenerative relationship to form a regenerative loop including the mechanically oscillatory element,
   (e) the gain of the amplifier being predetermined to lie between the gains required to produce oscillation of said element when in contact with and out of contact with said liquid,
   (f) a D.-C. voltage divider circuit including said pickup coil for producing a D.-C. voltage varying with the temperature of the coil,
   (g) a transistor having the emitter-collector circuit thereof connected across said pickup coil in the conductive direction with respect to said D.-C. voltage,
   (h) means for supplying the A.-C. output signal of said pickup coil to the base of said transistor,
   (i) the polarity of said transistor and the said D.-C. voltage being predetermined to change the load impedance presented by the transistor to the pickup coil as the temperature of the coil changes to reduce variations in the A.-C. output of the pickup coil as a function of temperature,
   (j) detection means for detecting the presence or absence of oscillations in said regenerative loop,
   (k) and detection means for detecting modulation of said output signal of the pickup means produced by boiling of said cryogenic liquid at the surface of said oscillatory element.

7. Cryogenic liquid level sensing apparatus which comprises
   (a) a transducer having a mechanically oscillatory element arranged for contact by a cryogenic liquid whose level is to be sensed and be damped thereby,
   (b) drive means in the transducer for producing mechanical oscillation of said element in response to an input electric signal thereto,
   (c) a pickup coil in the transducer for producing an A.-C. output signal in response to mechanical oscillation of said element,
   (d) an amplifier having an input connected to said pickup coil and an output connected to said drive means in regenerative relationship to form a regenerative loop including the mechanically oscillatory element,
   (e) the gain of the amplifier being predetermined to lie between the gains required to produce oscillation of said element when in contact with and out of contact with said liquid,
   (f) a D.-C. voltage divider circuit including said pickup coil for producing a D.-C. voltage which decreases with the temperature of the coil,
   (g) a transistor having the emitter-collector circuit thereof connected across said pickup coil in the conductive direction with respect to said D.-C. voltage,
   (h) a series circuit including a capacitor and resistor connected across the emitter-collector circuit of said transistor with the junction therebetween connected to the base of the transistor whereby a portion of the A.-C. output signal of the pickup coil is applied to the transistor base,
   (i) the polarity of said transistor and the said D.-C. voltage being predetermined to change the load impedance presented by the transistor to the pickup coil as the temperature of the coil changes to reduce variations in the A.-C. output of the pickup coil as a function of temperature,
   (j) a detector connected to receive oscillations from said regenerative loop and produce a first D.-C. output signal having different levels under oscillatory and non-oscillatory conditions in the loop,
   (k) an amplitude modulation detector connected to receive the output of said pickup coil and detect modulation thereof produced by boiling of said cryogenic liquid at the surface of said oscillatory element,
   (l) an amplifier and second detector connected to receive the output of said amplitude modulation detector and produce a second D.-C. output signal varying with said modulation,
   (m) an indicating circuit responsive to said D.-C. output signals,
   (n) and a cut-off circuit responsive to said first D.-C. output signal for supplying operating bias to the last-mentioned amplifier when loop oscillations are present and removing the bias to cut off the amplifier when loop oscillations are absent.

8. Cryogenic liquid level sensing apparatus which comprises
   (a) a magnetostrictive transducer having an oscillatory diaphragm positioned for contact by a cryogenic liquid whose level is to be sensed and be damped thereby, (b) an elongated magnetostrictive element attached to said diaphragm,
(c) drive and pickup coils encircling said magnetostrictive element for producing and responding to oscillation of said diaphragm,
(d) an amplifier having an input connected to said pickup coil and an output connected to said drive coil in regenerative relationship to form a regenerative loop including said oscillatory diaphragm,
(e) the gain of the amplifier being predetermined to lie between the gains required to produce oscillation of said diaphragm when in contact with and out of contact with said liquid,
(f) a D.-C. voltage divider circuit including resistance in series between a source of power and said pickup coil for producing a D.-C. voltage across the coil which decreases with the temperature of the coil,
(g) a transistor circuit including a transistor, a capacitor connected between the emitter and base thereof and a resistance connected between the base and collector thereof,
(h) said transistor circuit being connected across said pickup coil with the emitter thereof supplied with said D.-C. voltage,
(i) the polarity of said transistor and the D.-C. voltage applied thereto being predetermined to be in the conductive direction with respect to the emitter-collector path of the transistor,
(j) said transistor circuit being designed and adapted to provide a load impedance across said pickup coil which increases as said D.-C. voltage decreases to thereby reduce variations in the A.-C. output of the pickup coil as a function of temperature,
(k) a detector connected to receive oscillations from said regenerative loop and produce a first D.-C. output signal having different levels under oscillatory and non-oscillatory conditions in the loop,
(l) an amplitude modulation detector connected to receive the output of said pickup means and detect modulation thereof produced by boiling of said cryogenic liquid at the surface of said diaphragm,
(m) an amplifier and second detector connected to receive the output of said amplitude modulation detector and produce a second D.-C. output signal varying with said modulation.
(n) an indicating circuit responsive to said D.-C. output signals,
(o) and a cut-off circuit responsive to said first D.-C. output signal for supplying operating bias to the last-mentioned amplifier when loop oscillations are present and removing the bias to cut off the amplifier when loop oscillations are absent,
(p) said cut-off circuit including delay means for introducing a time delay in the supplying and removal of said bias.

9. In a cryogenic liquid level sensing apparatus including a transducer having a mechanically oscillatory member, driving means for producing oscillation of said member, and a pickup coil responsive to oscillation of said member for producing an A.-C. output signal, means for temperature-compensating the output of said pickup coil which comprises
(a) a D.-C. voltage divider circuit including said pickup coil for producing a D.-C. voltage varying with the temperature of the coil,
(b) a transistor having the emitter-collector circuit thereof connected across said pickup coil in the conductive direction with respect to said D.-C. voltage,
(c) and means for supplying the A.-C. output signal of said pickup coil to the base of said transistor,
(d) the polarity of said transistor and the said D.-C. voltage being predetermined to change the load impedance presented by the transistor to the pickup coil as the temperature of the coil changes to reduce variations in the A.-C. output of the pickup coil as a function of temperature.

10. In a cryogenic liquid level sensing apparatus including a transducer having a mechanically oscillatory member, driving means for producing oscillation of said member, and a pickup coil responsive to oscillation of said member for producing an A.-C. output signal, means for temperature-compensating the output of said pickup coil which comprises
(a) a D.-C. voltage divider circuit including said pickup coil for producing a D.-C. voltage which decreases with the temperature of the coil,
(b) a transistor having the emitter-collector circuit thereof connected across said pickup coil in the conductive direction with respect to said D.-C. voltage,
(c) and a series circuit including a capacitor and resistor connected across the emitter-collector circuit of said transistor with the junction therebetween connected to the base of the transistor whereby a portion of the A.-C. output signal of the pickup coil is applied to the transistor base,
(d) the polarity of said transistor and the said D.-C. voltage being predetermined to change the load impedance presented by the transistor to the pickup coil as the temperature of the coil changes to reduce variations in the A.-C. output of the pickup coil as a function of temperature.

11. In a cryogenic liquid level sensing apparatus including a transducer having a mechanically oscillatory member, driving means for producing oscillation of said member, and a pickup coil responsive to oscillation of said member for producing an A.-C. output signal, means for temperature-compensating the output of said pickup coil which comprises
(a) a D.-C. voltage divider circuit including resistance in series between a source of power and said pickup coil for producing a D.-C. voltage across the coil which decreases with the temperature of the coil,
(b) and a transistor circuit including a transistor, a capacitor connected between the emitter and base thereof and a resistance connected between the base and collector thereof,
(c) said transistor circuit being connected across said pickup coil with the emitter thereof supplied with said D.-C. voltage,
(d) the polarity of said transistor and the D.-C. voltage applied thereto being predetermined to be in the conductive direction wtih respect to the emitter-collector path of the transistor,
(e) said transistor circuit being designed and adapted to provide a load impedance across said pickup coil which increases as said D.-C. voltage decreases to thereby reduce variations in the A.-C. output of the pickup coil due to temperature changes.

References Cited by the Examiner

UNITED STATES PATENTS 3,139,544  6/1964  Tomes _____ 73—290 X

LOUIS R. PRINCE, *Primary Examiner.*

UNITED STATES PATENT OFFICE
CERTIFICATE OF CORRECTION

Patent No. 3,266,311 August 16, 1966

Howard P. Andreasen et al.

It is hereby certified that error appears in the above numbered patent requiring correction and that the said Letters Patent should read as corrected below.

Column 8, line 9, after "circuit" insert -- of --; column 9, lines 70 to 73, the first three lines of the table under the heading "Capacitors (microfarads):" should appear as shown below:

```
.002--------C1, C2, C9, C10
.004--------C7
.005--------C6, C15
```

Signed and sealed this 1st day of August 1967.

(SEAL)
Attest:

EDWARD M. FLETCHER, JR.
Attesting Officer

EDWARD J. BRENNER
Commissioner of Patents